United States Patent
Watanabe et al.

(10) Patent No.: US 11,390,245 B2
(45) Date of Patent: Jul. 19, 2022

(54) TIRE ANTI-THEFT SYSTEM, VEHICLE CONTROL APPARATUS, AND VEHICLE CONTROL METHOD

(71) Applicant: BRIDGESTONE CORPORATION, Chuo-ku Tokyo (JP)

(72) Inventors: Jun Watanabe, Kokubunji (JP); Shin Sukegawa, Tokyo (JP); Takayuki Ohara, Tokyo (JP); Kenji Matsuo, Kodaira (JP); Kotaro Yamada, Kodaira (JP); Satoshi Hirajima, Kodaira (JP); Suguru Yamaguchi, Kawasaki (JP)

(73) Assignee: BRIDGESTONE CORPORATION, Tokyo (JP)

( * ) Notice: Subject to any disclaimer, the term of this patent is extended or adjusted under 35 U.S.C. 154(b) by 277 days.

(21) Appl. No.: 16/769,242

(22) PCT Filed: Sep. 12, 2018

(86) PCT No.: PCT/JP2018/033883
§ 371 (c)(1),
(2) Date: Jun. 3, 2020

(87) PCT Pub. No.: WO2019/111486
PCT Pub. Date: Jun. 13, 2019

(65) Prior Publication Data
US 2021/0179016 A1    Jun. 17, 2021

(30) Foreign Application Priority Data
Dec. 6, 2017 (JP) .............................. JP2017-234622

(51) Int. Cl.
*B60R 25/01* (2013.01)
*B60R 25/102* (2013.01)
(Continued)

(52) U.S. Cl.
CPC ............ *B60R 25/01* (2013.01); *B60R 25/102* (2013.01); *B60R 25/34* (2013.01); *G06F 16/22* (2019.01); *B60R 2325/103* (2013.01)

(58) Field of Classification Search
CPC ....... B60R 25/01; B60R 25/102; B60R 25/34; G06F 16/22
(Continued)

(56) References Cited

U.S. PATENT DOCUMENTS

2004/0090344 A1    5/2004    Caretta et al.
2005/0088321 A1    4/2005    Weber
(Continued)

FOREIGN PATENT DOCUMENTS

| CN | 201385643 Y | 1/2010 |
|---|---|---|
| CN | 101638084 A | 2/2010 |

(Continued)

OTHER PUBLICATIONS

Nov. 29, 2021, search result of Office Action issued by the China National Intellectual Property Administration in the corresponding Chinese Patent Application No. 201880078826.6.
(Continued)

*Primary Examiner* — Yong Hang Jiang
(74) *Attorney, Agent, or Firm* — Kenja IP Law PC

(57) ABSTRACT

A tire anti-theft system includes a transmitter attached to a tire and configured to transmit tire ID information; a first database configured to store vehicle ID information and tire ID information of a tire mounted on the vehicle; a second database configured to store the tire ID information and tire status information indicating whether or not the tire identified with the tire ID information is stolen tire; and a vehicle control apparatus, in which the vehicle control apparatus includes a reader configured to perform near field communication with the transmitter attached to the tire mounted on
(Continued)

a vehicle to be controlled and acquire the tire ID information, and a controller configured to, in a case where the reader acquires the tire ID information, restrict operation of the vehicle to be controlled if information indicating that the tire is stolen tire is stored in association with the tire ID information.

16 Claims, 4 Drawing Sheets

(51) Int. Cl.
 *B60R 25/34* (2013.01)
 *G06F 16/22* (2019.01)
(58) Field of Classification Search
 USPC ........................................................ 701/29.2
 See application file for complete search history.

(56) References Cited

U.S. PATENT DOCUMENTS

| | | | | |
|---|---|---|---|---|
| 2009/0284357 | A1* | 11/2009 | Ortega | B60R 25/1001 340/425.5 |
| 2010/0156641 | A1 | 6/2010 | Lionetti et al. | |
| 2012/0126967 | A1 | 5/2012 | McCormick et al. | |
| 2015/0314752 | A1 | 11/2015 | Shigetomi | |
| 2017/0057461 | A1* | 3/2017 | Gaskin | B60C 23/0408 |
| 2020/0001828 | A1* | 1/2020 | Loeffler | B60C 23/0479 |

FOREIGN PATENT DOCUMENTS

| | | |
|---|---|---|
| CN | 104553638 A | 4/2015 |
| CN | 104590207 A | 5/2015 |
| CN | 206124979 U | 4/2017 |
| JP | 2005178522 A | 7/2005 |
| JP | 2005258932 A | 9/2005 |
| JP | 2006088819 A | 4/2006 |
| JP | 2006256361 A | 9/2006 |
| JP | 2010228486 A | 10/2010 |
| JP | 2014117971 A | 6/2014 |
| JP | 2017132292 A | 8/2017 |
| KR | 1020070119781 A | 12/2007 |
| KR | 1020140091108 A | 7/2014 |
| WO | 2007074738 A1 | 7/2007 |
| WO | 2016059487 A1 | 4/2016 |

OTHER PUBLICATIONS

Jun. 9, 2020, International Preliminary Report on Patentability issued in the International Patent Application No. PCT/JP2018/033883.

Nov. 20, 2018, International Search Report issued in the International Patent Application No. PCT/JP2018/033883.

Jun. 22, 2021, search result of the Extended European Search Report issued by the European Patent Office in the corresponding European Patent Application No. 18886890.5.

* cited by examiner

FIG. 2

| Vehicle ID information | Tire ID information |
|---|---|
| 0001 | 00001A |
| | 00001B |
| | 00001C |
| | 00001D |
| 0002 | 00002A |
| | 00002B |
| | 00002C |
| | 00002D |
| ⋮ | ⋮ |

FIG. 3

| Tire ID information | Tire status information | Vehicle ID information |
|---|---|---|
| 0001A | | 0001 |
| 0002A | | 0002 |
| ⋮ | | ⋮ |

FIG. 4

| Vehicle ID information | Contact address |
|---|---|
| 0001 | ○○@×× |
| 0002 | △△@×× |
| ⋮ | ⋮ |

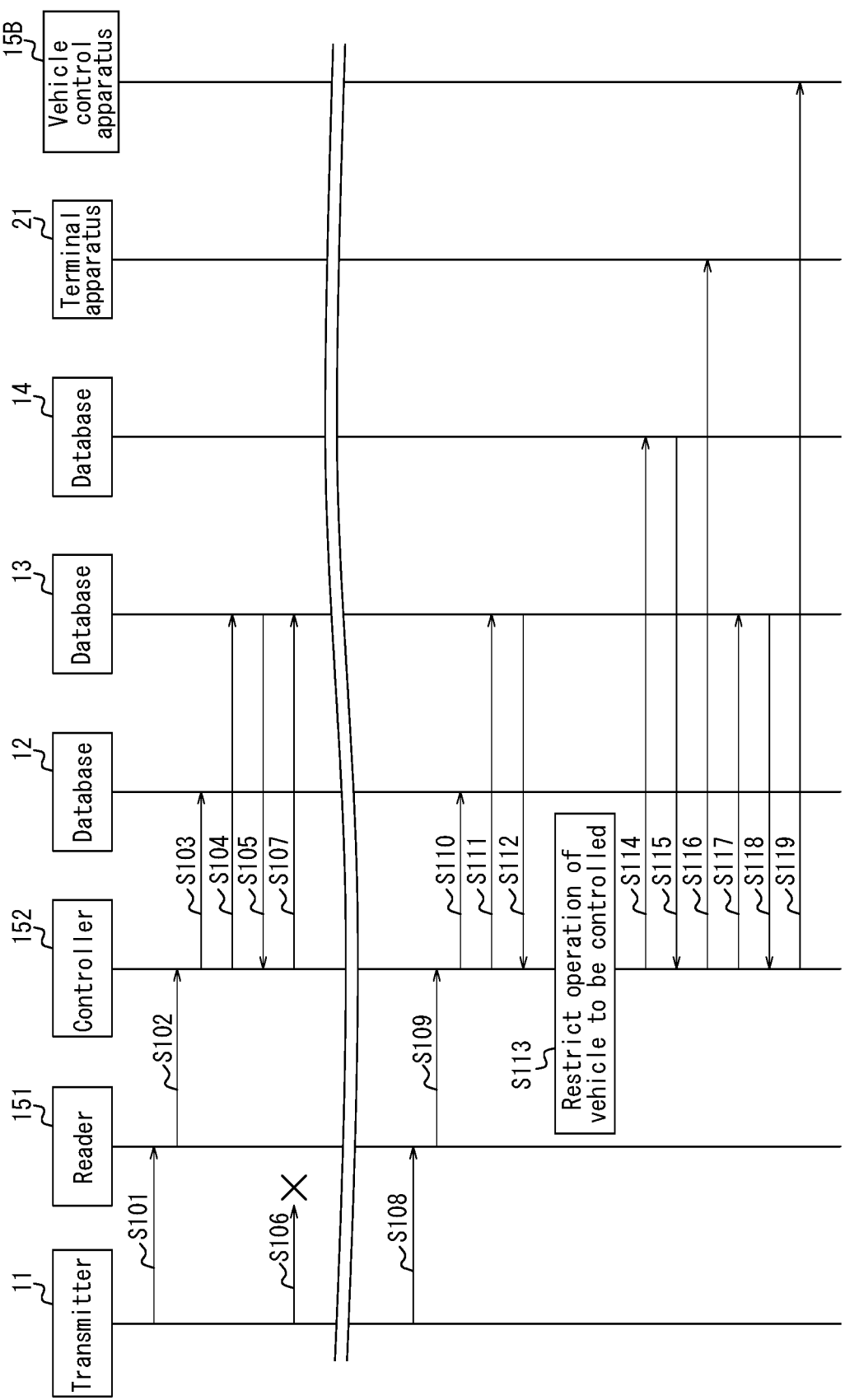

TIRE ANTI-THEFT SYSTEM, VEHICLE CONTROL APPARATUS, AND VEHICLE CONTROL METHOD

TECHNICAL FIELD

The present disclosure relates to a tire anti-theft system, a vehicle control apparatus, and a vehicle control method.

BACKGROUND

Among tires to be mounted on a vehicle, there are tires to which RFID (Radio-Frequency Identification) tags for performing near field communication are attached (see, for example, PTL 1).

CITATION LIST

Patent Literature

PTL 1: Japanese Patent Laid-Open No. 2017-132292

SUMMARY

Technical Problem

By the way, damage due to theft of tires mounted on parked vehicles is incurred, and is problematic. Therefore, a technique for preventing tire theft with a simple configuration or method is desired.

An object of the present disclosure which has been made in view of the problem as described above, is to provide a tire anti-theft system, a vehicle control apparatus, and a vehicle control method which are capable of preventing tire theft with a simple configuration or method.

Solution to Problem

A tire anti-theft system that as one aspect of the present disclosure is a tire anti-theft system which prevents tires mounted on a vehicle from being stolen, the tire anti-theft system including: a transmitter attached to a tire and configured to transmit tire ID information for identifying the tire; a first database configured to store vehicle ID information for identifying a vehicle and rightful tire ID information which is tire ID information of a rightful tire mounted on the vehicle in associated with each other; a second database configured to store tire ID information of the tire and tire status information indicating whether or not the tire identified with the tire ID information is a stolen tire in association with each other; and a vehicle control apparatus mounted on a vehicle to be controlled and configured to control the vehicle to be controlled, wherein the vehicle control apparatus includes a reader configured to perform near field communication with a transmitter attached to the tire mounted on the vehicle to be controlled, to acquire the tire ID information transmitted by the transmitter, and a controller configured to, in a case where the reader cannot acquire the rightful tire ID information, determine that the tire identified with the rightful tire ID information has been stolen, and update the tire status information stored in the second database in association with the rightful tire ID information with information indicating that the tire identified with the rightful tire ID information is a stolen tire, and in a case where the reader acquires the tire ID information, the controller refers to the second database, and if the information indicating that the tire identified with the tire ID information is a stolen tire is stored as the tire status information in association with the tire ID information, the controller restricts operation of the vehicle to be controlled.

A vehicle control apparatus as one aspect of the present disclosure is a vehicle control apparatus which is mounted on a vehicle to be controlled and is configured to control the vehicle to be controlled, the vehicle control apparatus including: a reader configured to preform near field communication with a transmitter which is attached to a tire mounted on the vehicle to be controlled and which transmits tire ID information for identifying the tire, to acquire the tire ID information transmitted by the transmitter; and a controller configured to, in a case where the reader cannot acquire rightful tire ID information stored in a first database in association with vehicle ID information of the vehicle to be controlled, determine that the tire identified with the rightful tire ID information has been stolen and update tire status information stored in a second database with information indicating that the tire identified with the rightful tire ID information is a stolen tire, the first database being configured to store vehicle ID information for identifying a vehicle and the rightful tire ID information which is tire ID information of a rightful tire mounted on the vehicle in association with each other, the second database being configured to store tire ID information for identifying a tire and the tire status information indicating whether or not the tire identified with the tire ID information is a stolen tire in association with each other, wherein in a case where the reader acquires the tire ID information, the controller refers to the second database, and if the information indicating that the tire identified with the tire ID information is a stolen tire is stored as the tire status information in association with the tire ID information, the controller restricts operation of the vehicle to be controlled.

A vehicle control method as one aspect of the present disclosure is a vehicle control method for controlling a vehicle to be controlled, the method including: a step of, by a reader configured to perform near field communication with a transmitter which is attached to a tire mounted on a vehicle to be controlled and which transmits tire ID information for identifying the tire, acquiring the tire ID information transmitted by the transmitter; a step of, in a case where the reader cannot acquire rightful tire ID information stored in a first database in association with vehicle ID information of the vehicle to be controlled, determining that the tire identified with the rightful tire ID information has been stolen and updating tire status information stored in a second database with information indicating that the tire identified with the rightful tire ID information is a stolen tire, the first database being configured to store vehicle ID information for identifying a vehicle and the rightful tire ID information which is tire ID information of a rightful tire mounted on the vehicle in association with each other, the second database being configured to store tire ID information for identifying a tire and the tire status information indicating whether or not the tire identified with the tire ID information is a stolen tire in association with each other; and a step of, in a case where the reader acquires the tire ID information, referring to the second database, and if the information indicating that the tire identified with the tire ID information is a stolen tire is stored as the tire status information in association with the tire ID information, restricting operation of the vehicle to be controlled.

Advantageous Effect

According to the present disclosure, it is possible to provide a tire anti-theft system, a vehicle control apparatus, and a vehicle control method which are capable of preventing tire theft with a simple configuration or method.

BRIEF DESCRIPTION OF THE DRAWINGS

In the accompanying drawings:

FIG. 2 is a view illustrating a configuration example of a first database illustrated in FIG. 1;

FIG. 3 is a view illustrating a configuration example of a second database illustrated in FIG. 1;

FIG. 4 is a view illustrating a configuration example of a third database illustrated in FIG. 1; and FIG. 5 is a sequence diagram illustrating an example of operation of the tire anti-theft system illustrated in FIG. 1.

DETAILED DESCRIPTION

Figure 1:
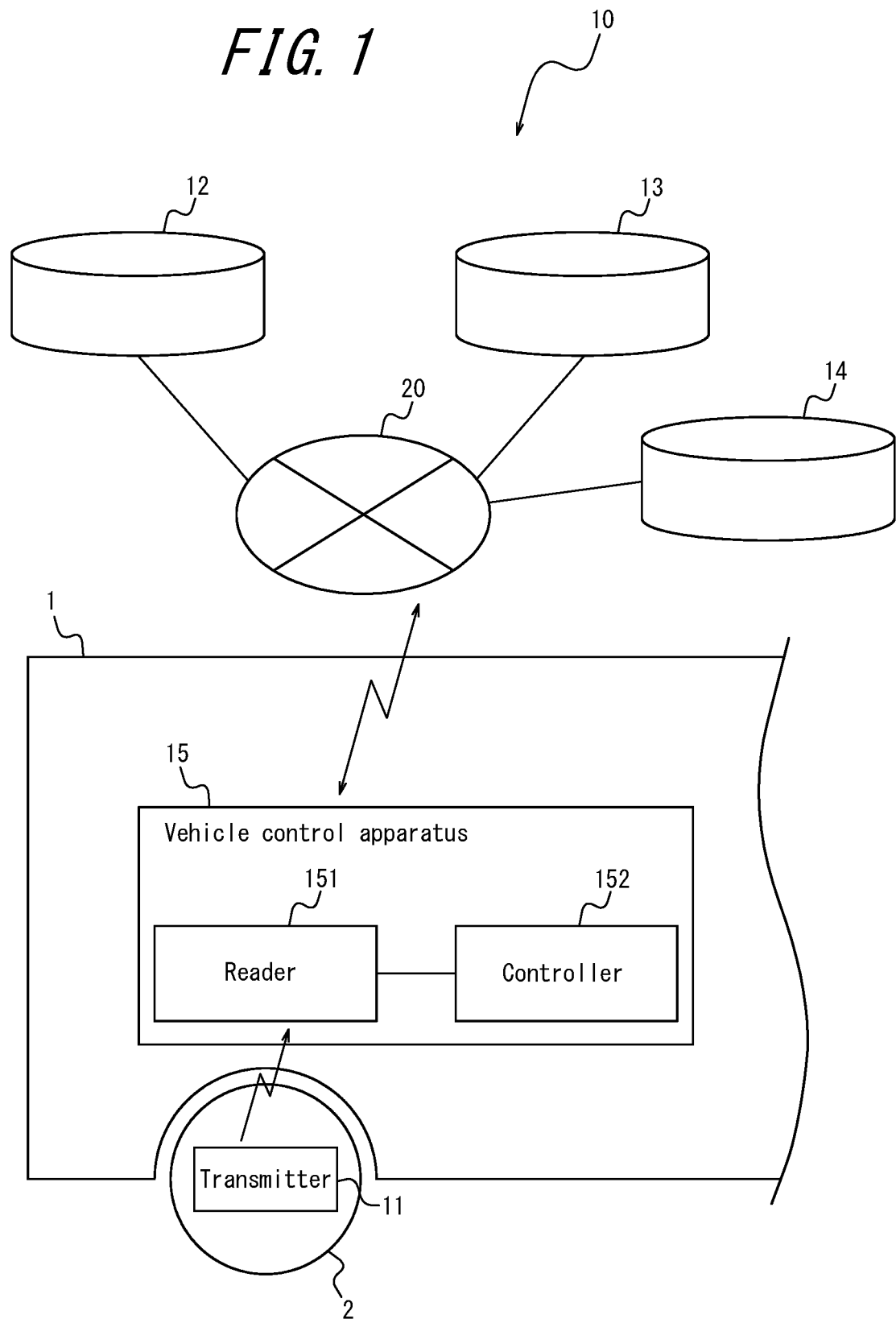
FIG. 1 is a view illustrating a configuration example of a tire anti-theft system according to an embodiment of the present disclosure.

An embodiment of the present disclosure will be described below with reference to the drawings. Note that, in the respective drawings, the same reference numerals indicate the same or equivalent components.

FIG. 1 is a view illustrating a configuration example of a tire anti-theft system 10 according to an embodiment of the present disclosure. When a tire 2 stolen from another vehicle 1 (hereinafter referred to as a burglarized vehicle) is mounted on a vehicle 1 to be controlled, the tire anti-theft system 10 according to the present embodiment prevents the tire 2 from being stolen by restricting operation of the vehicle 1 to be controlled.

The tire anti-theft system 10 illustrated in FIG. 1 includes a transmitter 11, databases 12, 13, and 14, and a vehicle control apparatus 15. The databases 12, 13, and 14 can perform communication with the vehicle control apparatus 15 via a network 20. Further, in FIG. 1, while only one vehicle control apparatus 15 is illustrated, in the present embodiment, the vehicle control apparatuses 15 are respectively mounted on a plurality of vehicles 1, and the vehicle control apparatuses 15 can perform communication with each other via the network 20.

The transmitter 11 is attached to the tire 2 mounted on the vehicle 1. The transmitter 11 is, for example, incorporated into the tire 2 (embedded in the tire 2 or pasted on an inner surface of the tire 2). Further, the transmitter 11 may be pasted on an outer surface of the tire 2 if a position where the transmitter 11 is pasted is a position where the transmitter 11 is difficult to be removed from the tire 2, and a position where the transmitter 11 is not affected by contact between the tire 2 and a road surface. The transmitter 11 transmits a predetermined signal, for example, identification information for identifying the tire 2 (hereinafter, referred to as tire ID information) to which the transmitter 11 is attached. Specific examples of the transmitter 11 can include an RFID tag. The RFID tag performs near field (approximately several centimeters to several meters) communication with a reader apparatus using an electromagnetic field, a radio wave, or the like, to exchange information.

As illustrated in FIG. 2, the database 12 (first database) stores vehicle ID information of the vehicle 1, and rightful tire ID information which is tire ID information of at least one tire 2 (a rightful tire rightfully possessed by the owner of the vehicle 1) mounted on the vehicle 1 in association with each other. FIG. 2 illustrates an example where the vehicle ID information of the vehicle 1 is associated with respective pieces of tire ID information of four tires 2 mounted on the vehicle 1. In the database 12, for example, the vehicle ID information of the vehicle 1 and the tire ID information of the tires 2 mounted on the vehicle 1 are stored upon shipment, or the like, of the vehicle 1.

As illustrated in FIG. 3, the database 13 (second database) stores the tire ID information of the tire 2, tire status information indicating whether or not the tire identified with the tire ID information is a stolen tire, and identification information for identifying a vehicle 1 in which information indicating that the tire 2 identified with the tire ID information is a stolen tire is registered as the tire status information (hereinafter referred to as vehicle ID information), in association with each other. In the database 13, the tire ID information of the tire 2 is stored, for example, when the tire 2 is mounted on the vehicle 1 to be monitored.

As illustrated in FIG. 4, the database 14 (third database) stores the vehicle ID information of the vehicle 1, and contact information of the owner of the vehicle 1 (for example, contact information (such as an e-mail address) of a terminal apparatus owned by the owner of the vehicle 1) in association with each other. In the database 14, for example, the vehicle ID information of the vehicle 1 and the contact information of the terminal apparatus owned by a purchaser who has purchased the vehicle 1 are stored in association with each other upon sales, or the like, of the vehicle 1. As the terminal apparatus, there are various kinds of apparatuses such as a mobile phone, a smartphone and a tablet terminal, having a communication function.

Note that while, in the present embodiment, the database 12 and database 14 are separately described, the present disclosure is not limited to this. The vehicle ID information, the tire ID information of the tire 2 mounted on the vehicle 1 identified with the vehicle ID information, and the contact information of the owner of the vehicle 1 may be stored in association with each other on one database.

The vehicle control apparatus 15 is mounted on the vehicle 1, and controls operation of the vehicle 1. The vehicle control apparatus 15 may be incorporated in the vehicle 1 in advance or may be additionally mounted on the vehicle 1. In a case where the vehicle control apparatus 15 is incorporated into the vehicle 1, the vehicle control apparatus 15 is mounted on, for example, an ECU (Electronic Control Unit) which performs operation control of the vehicle 1.

The vehicle control apparatus 15 includes a reader 151 and a controller 152.

The reader 151 regularly performs near field (approximately several centimeters to several meters) communication with the transmitter 11 attached to the tire 2 mounted on the vehicle 1 on which the vehicle control apparatus 15 is mounted (hereinafter, referred to as a vehicle 1 to be controlled), for example, at predetermined time intervals (for example, once every several hours), to acquire the tire ID information transmitted by the transmitter 11. A communication distance between the reader 151 and the transmitter 11 is set at a distance such that communication is possible in a state where the tire 2 is mounted on the vehicle 1, and, if the tire 2 is removed from the vehicle 1 and the tire 2 separates from the vehicle 1 by a distance equal to or greater than a predetermined distance, communication becomes impossible. The communication distance between the reader 151 and the transmitter 11 can be adjusted by, for example, a frequency, or the like, to be used for communication. The reader 151 outputs the acquired tire ID information to the controller 152.

In a case where the reader 151 cannot acquire the tire ID information (rightful tire ID information), the controller 152 determines that the tire 2 mounted on the vehicle 1 has been stolen. As described above, the communication distance between the reader 151 and the transmitter 11 is set at a distance such that communication is possible in a state where the tire 2 is mounted on the vehicle 1, and, if the tire 2 is removed from the vehicle 1, and the tire 2 separates from the vehicle 1 by a distance equal to or greater than a predetermined distance, communication becomes impossible. Therefore, in a case where the reader 151 cannot acquire the tire ID information (rightful tire ID information), the state can be estimated as a state where the tire 2 is removed from the vehicle 1 and separates from the vehicle 1 by a distance equal to or greater than the predetermined distance, that is, a state where the tire 2 has been stolen. Therefore, the controller 152 can determine whether or not the tire 2 has been stolen from a communication state between the reader 151 and the transmitter 11.

Upon determining that the tire 2 mounted on the vehicle 1 to be controlled has been stolen, the controller 152 updates the tire status information stored in the database 13 in association with the tire ID information of the tire 2 with information indicating that the tire 2 identified with the tire ID information is a stolen tire. Furthermore, in a case where tire ID information is acquired by the reader 151, the controller 152 registers the tire ID information in the database 12 in association with the vehicle ID information of the vehicle 1 to be controlled. Furthermore, in a case where tire ID information is acquired by the reader 151, the controller 152 refers to the database 13, and if information indicating that the tire 2 identified with the tire ID information is a stolen tire is stored in association with the tire ID information, the controller 152 restricts operation of the vehicle 1 to be controlled. The controller 152 restricts operation of the vehicle 1 to be controlled, for example, by disabling the engine of the vehicle 1 to be controlled from starting.

Operation of the tire anti-theft system 10 according to the present embodiment will be described next.

FIG. 5 is a sequence diagram illustrating an example of operation of the tire anti-theft system 10.

First, operation performed when the tire 2 mounted on the vehicle 1 to be controlled is stolen will be described.

The reader 151 performs near field communication with the transmitter 11 attached to the tire 2 mounted on the vehicle 1 at predetermined time intervals, to acquire the tire ID information of the tire 2 transmitted by the transmitter 11 (step S101). Then, the reader 151 outputs the acquired tire ID information to the controller 152 (step S102).

In a case where the tire ID information is output from the reader 151, the controller 152 registers the tire ID information in the database 12 in association with the vehicle ID information of the vehicle 1 to be controlled (step S103). Furthermore, in a case where the tire ID information is output from the reader 151, the controller 152 refers to the database 13 (step S104), and acquires the tire status information stored in association with the tire ID information (step S105).

In a case where the acquired tire status information indicates that the tire identified with the tire ID information outputted from the reader 151 is not a stolen tire, the controller 152 terminates processing once and enters a wait state for output of tire ID information from the transmitter 11.

In a case where tire ID information is not output from the reader 151 with predetermined timing (timed with communications between the transmitter 11 and reader 151), i.e., the reader 151 is unable to acquire tire ID information (rightful tire ID information) from the transmitter 11 (step S106), the controller 152 determines that the tire 2 to which the transmitter 11 is attached has been stolen.

Upon determining that the tire 2 has been stolen, the controller 152 updates the tire status information stored in the database 13 in association with the tire ID information of the tire 2 with information indicating that the tire 2 identified with the tire ID information is a stolen tire (step S107). Consequently, if the tire 2 mounted on the vehicle 1 to be controlled is stolen, the fact that the tire 2 is a stolen tire can be registered in the database 13.

Next, operation performed when a stolen tire is mounted on the vehicle 1 to be controlled will be described.

When a tire 2 (stolen tire) is mounted on the vehicle 1 to be controlled, the reader 151 performs near field communication with the transmitter 11 attached to the tire 2 at predetermined time intervals, to acquire the tire ID information of tire 2 transmitted by the transmitter 11 (step S108). Then, the reader 151 outputs the acquired tire ID information to the controller 152 (step S109).

In a case where the tire ID information is output from the reader 151, the controller 152 registers the tire ID information in the database 12 in association with the vehicle ID information of the vehicle 1 to be controlled (step S110). Furthermore, in a case where the tire ID information is output from the reader 151, the controller 152 refers to the database 13 (step S111), and acquires the tire status information stored in association with the tire ID information (step S112).

In a case where the acquired tire status information indicates that the tire identified with the tire ID information output from the reader 151 is a stolen tire, the controller 152 determines that a stolen tire is mounted on the vehicle 1 to be controlled, and restricts operation of the vehicle 1 to be controlled, such that the vehicle 1 to be controlled cannot run normally (step S113). The controller 152 restricts operation of the vehicle 1 to be controlled, for example, by disabling the engine of the vehicle 1 to be controlled from starting or disabling the vehicle 1 from running at a predetermined speed or above. This inhibits the use of the vehicle 1 to be controlled with the stolen tire 2 mounted thereon, making it possible to deter theft of tires 2, and thus to prevent the tires 2 from being stolen.

Also, in a case where information indicating that the tire 2 identified with the tire ID information is a stolen tire is stored in the database 13 as tire status information in association with the tire ID information acquired by the reader 151, the controller 152 may issue an alarm to surroundings of the vehicle 1 to be controlled. The controller 152 issues an alarm to surroundings of the vehicle 1 to be controlled, for example, running honking of the vehicle 1 to be controlled, displaying information indicating that a stolen tire is mounted on the vehicle 1 to a display in a case where the vehicle 1 to be controlled includes the display, or the like. In this way, in a case where a stolen tire is mounted on the vehicle 1 to be controlled, by issuing an alarm to surroundings of the vehicle 1 to be controlled, it is possible to inhibit the use of the vehicle 1 to be controlled with the stolen tire 2 mounted thereon, and thus to prevent the tires 2 from being stolen.

Furthermore, in a case where information indicating that the tire 2 identified with the tire ID information is a stolen tire is stored in the database 13 as tire status information in association with the tire ID information acquired by the reader 151, the controller 152 may provide information (position information, owner information, and the like) of the vehicle 1 to be controlled to a predetermined institution (such as a police station and a security company). In this way, in a case where a stolen tire is mounted on the vehicle 1 to be controlled, information regarding the vehicle 1 to be controlled is provided to a predetermined institution, information that a stolen tire is possessed and used is grasped by the police or the like. This makes it difficult to mount and use the stolen tire 2, thereby making it possible to prevent tires 2 from being stolen.

Furthermore, in a case where information indicating that the tire 2 identified with the tire ID information is a stolen tire is stored in the database 13 as tire status information in association with the tire ID information acquired by the reader 151, the controller 152 may notify the owner of the vehicle 1 to be controlled that the tire 2 mounted on the vehicle 1 to be controlled is a stolen tire. A case in which such an operation is performed will be described below with reference to FIG. 5.

Upon determining that the vehicle 1 to be controlled is mounted with a stolen tire, the controller 152 refers to the database 14 (step S114) and acquires a contact information (contact information of a terminal apparatus 21 owned by the owner of the vehicle 1 to be controlled) stored in the database 14 in association with the vehicle 1 to be controlled (step S115). Then, the controller 152 notifies the terminal apparatus 21 whose contact information has been acquired that the tire 2 mounted on the vehicle 1 to be controlled is a stolen tire (step S116). In this way, in a case where a stolen tire is mounted on the vehicle 1 to be controlled, by notifying the terminal apparatus 21 owned by the owner of the vehicle 1 to be controlled to that effect, it is possible to alert the owner of the vehicle 1 to be controlled if the owner has mounted the tire 2 on the vehicle 1 to be controlled without knowing that the tire 2 is a stolen tire.

Furthermore, in a case where information indicating that the tire 2 identified with the tire ID information is a stolen tire is stored in the database 13 as tire status information in association with the tire ID information acquired by the reader 151, the controller 152 may provide information regarding the vehicle 1 to be controlled to the vehicle control apparatus 15 (hereinafter referred to as a vehicle control apparatus 15B) mounted on the vehicle 1 (hereinafter referred to as a burglarized vehicle 1B) originally mounted with the tire 2. A case in which such an operation is performed will be described below with reference to FIG. 5.

Upon determining that the vehicle 1 to be controlled is mounted with a stolen tire, the controller 152 refers to the database 13 (step S117), and acquires the vehicle ID information (vehicle ID information of the burglarized vehicle 1B) stored in the database 13 in association with the tire ID information acquired by the reader 151 (step S118). Then, the controller 152 provides information regarding the vehicle 1 to be controlled to the vehicle control apparatus 15B mounted on the burglarized vehicle 1B identified with the acquired vehicle ID information (step S119). The vehicle control apparatus 15B passes the provided information, for example, to the terminal apparatus owned by the owner of the vehicle 1 including the vehicle control apparatus 15B. In this way, in a case where a stolen tire is mounted on the vehicle 1 to be controlled, information regarding the vehicle 1 to be controlled is provided to the vehicle control apparatus 15B of the burglarized vehicle 1B, making it easy for the owner of the burglarized vehicle 1B to keep track of the stolen tire 2 and locate the person who has stolen the tire 2 and thereby making it possible to prevent tires 2 from being stolen.

In this way, the tire anti-theft system 10 according to the present embodiment includes the transmitter 11 which is attached to tire 2 and which transmits tire ID information for identifying the tire 2; the database 12 (first database) which stores vehicle ID information for identifying a vehicle 1 and rightful tire ID information which is tire ID information of rightful tire 2 mounted on the vehicle 1 in association with each other; the database 13 (second database) which stores tire ID information and tire status information indicating whether or not the tire identified with the tire ID information is a stolen tire in association with each other; and the vehicle control apparatus 15 which is mounted on a vehicle 1 to be controlled and which controls the vehicle 1 to be controlled. The vehicle control apparatus 15 includes the reader 151 which performs near field communication with the transmitter 11 attached to the tire 2 mounted on the vehicle 1 to be controlled to acquire the tire ID information transmitted by the transmitter 11, and the controller 152 which, in a case where the reader 151 cannot acquire the rightful tire ID information, determines that the tire 2 identified with the rightful tire ID information has been stolen, and updates the tire status information stored in the database 13 in association with the rightful tire ID information with information indicating that the tire 2 identified with the rightful tire ID information is a stolen tire. In a case where the reader 151 acquires the tire ID information, the controller 152 refers to the database 13, and if the information indicating that the tire 2 identified with the tire ID information is a stolen tire is stored as the tire status information in association with the tire ID information, the controller 152 restricts operation of the vehicle 1 to be controlled.

Further, the vehicle control apparatus 15 according to the present embodiment includes: a reader 151 which performs near field communication with a transmitter 11 which is attached to a tire 2 mounted on the vehicle 1 to be controlled and which transmits tire ID information for identifying the tire 2, to acquire the tire ID information transmitted by the transmitter 11; and a controller 152 which, in a case where the reader 151 cannot acquire rightful tire ID information stored in a database 12 (first database) in association with vehicle ID information of the vehicle 1 to be controlled, determines that the tire 2 identified with rightful tire ID information has been stolen and updates tire status information stored in a database 13 (second database) with information indicating that the tire 2 identified with the rightful tire ID information is a stolen tire, the database 12 being configured to store vehicle ID information for identifying a vehicle 1 and the rightful tire ID information which is tire ID information of a rightful tire 2 mounted on the vehicle 1 in association with each other, the database 13 being configured to store tire ID information identifying a tire 2 and the tire status information indicating whether or not the tire 2 identified with the tire ID information is a stolen tire in association with each other. In a case where the reader 151 acquires the tire ID information, the controller 152 refers to the database 13, and if the information indicating that the tire 2 identified with the tire ID information is a stolen tire is stored as the tire status information in association with the tire ID information, the controller 152 restricts operation of the vehicle 1 to be controlled.

Further, a vehicle control method according to the present embodiment includes: a step of, by a reader 151 configured to perform near field communication with a transmitter 11 which is attached to a tire 2 mounted on a vehicle 1 to be controlled and which transmits tire ID information for identifying the tire 2, acquiring tire ID information transmitted by the transmitter 11; a step of, in a case where the reader 151 cannot acquire rightful tire ID information stored in the database 12 in association with vehicle ID information of the vehicle 1 to be controlled, determining that the tire 2 identified with rightful tire ID information has been stolen and updating tire status information stored in the database 13 (second database) with information indicating that the tire 2 identified with the rightful tire ID information is a stolen tire, the database 12 being configured to store vehicle ID information for identifying a vehicle 1 and the rightful tire ID information which is tire ID information of a rightful tire 2 mounted on the vehicle 1 in association with each other, the database 13 being configured to store tire ID information for identifying a tire 2 and the tire status information indicating whether or not the tire 2 identified with the tire ID information is a stolen tire in association with each other; and a step of, in a case where the reader 151 acquires the tire ID information, referring to the database 13, and if the information indicating that the tire 2 identified with the tire ID information is a stolen tire is stored as the tire status information in association with the tire ID information, restricting operation of the vehicle to be controlled.

Using a simple configuration or method for determining whether or not the reader 151 can acquire tire ID information (rightful tire ID information) from the transmitter 11 attached to the tire 2, it is possible to determine whether or not the tire 2 mounted on the vehicle 1 has been stolen. Furthermore, if it is determined that a stolen tire is mounted on the vehicle 1 to be controlled, operation of the vehicle 1 to be controlled is restricted, inhibiting the use of the vehicle 1 to be controlled with the stolen tire 2 mounted thereon and thereby making it possible to deter theft of tires 2, and thus to prevent the tires 2 from being stolen.

The tire anti-theft system, the vehicle control apparatus, and the vehicle control method according to the present disclosure are not limited to the specific configurations described in the above-described embodiment, and various modifications and changes can be made without deviating from the scope of the claims.

REFERENCE SIGNS LIST

1 Vehicle
2 Tire
10 Tire anti-theft system
11 Transmitter
12 Database (first database)
13 Database (second database)
14 Database (third database)
15, 15B Vehicle control apparatus
20 Network
21 Terminal apparatus
151 Reader
152 Controller

The invention claimed is:

1. A tire anti-theft system which prevents tires mounted on a vehicle from being stolen, the tire anti-theft system comprising:
a transmitter attached to a tire and configured to transmit tire ID information for identifying the tire;
a first database configured to store vehicle ID information for identifying a vehicle and rightful tire ID information which is tire ID information of a rightful tire mounted on the vehicle in association with each other;
a second database configured to store tire ID information of the tire and tire status information indicating whether or not the tire identified with the tire ID information is a stolen tire in association with each other; and
a vehicle control apparatus mounted on a vehicle to be controlled and configured to control the vehicle to be controlled, wherein the vehicle control apparatus comprises:
a reader configured to perform near field communication with the transmitter attached to the tire mounted on the vehicle to be controlled, to acquire the tire ID information transmitted by the transmitter; and
a controller configured to, in a case where the reader cannot acquire the rightful tire ID information, determine that the tire identified with the tire ID information has been stolen, and update the tire status information stored in the second database in association with the tire ID information with information indicating that the tire identified with the tire ID information is a stolen tire, and
in a case where the reader acquires the tire ID information, the controller refers to the second database, and if the information indicating that the tire identified with the tire ID information is a stolen tire is stored as the tire status information in association with the tire ID information, the controller restricts operation of the vehicle to be controlled.

2. The tire anti-theft system according to claim 1, wherein:
the second database further stores vehicle ID information of a vehicle in which information indicating that the tire identified with the tire ID information is a stolen tire is registered as the tire status information in association with the tire ID information; and
in a case where the information that indicates that the tire identified with the tire ID information is a stolen tire is stored in the second database as the tire status information in association with the tire ID information acquired by the reader, the controller provides information regarding the vehicle to be controlled to the vehicle control apparatus mounted on the vehicle identified with the vehicle ID information stored in the second database in association with the tire ID information.

3. The tire anti-theft system according to claim 1, wherein, in a case where the information that indicates that the tire identified with the tire ID information is a stolen tire is stored in the second database as the tire status information in association with the tire ID information acquired by the reader, the controller issues an alarm to surroundings of the vehicle to be controlled.

4. The tire anti-theft system according to claim 1, wherein, in a case where the information that indicates that the tire identified with the tire ID information is a stolen tire is stored in the second database as the tire status information in association with the tire ID information acquired by the reader, the controller provides information regarding the vehicle to be controlled to a predetermined institution.

5. The tire anti-theft system according to claim 1, further comprising a third database configured to store the vehicle ID information and a contact information of an owner of a vehicle identified with the vehicle ID information in association with each other, wherein in a case where the information that indicates that the tire identified with the tire ID information is a stolen tire is stored in the second database as the tire status information in association with the tire ID information acquired by the reader, the controller notifies that the tire identified with the tire ID information is a stolen tire to the contact information stored in the third database in association with the vehicle ID information of the vehicle to be controlled.

6. A vehicle control apparatus which is mounted on a vehicle to be controlled and is configured to control the vehicle to be controlled, the vehicle control apparatus comprising:
  a reader configured to perform near field communication with a transmitter which is attached to a tire mounted on the vehicle to be controlled and which transmits tire ID information for identifying the tire, to acquire the tire ID information transmitted by the transmitter; and
  a controller configured to, in a case where the reader cannot acquire rightful tire ID information stored in a first database in association with vehicle ID information of the vehicle to be controlled, determine that the tire identified with the tire ID information has been stolen and update tire status information stored in a second database with information indicating that the tire identified with the tire ID information is a stolen tire, the first database being configured to store vehicle ID information for identifying a vehicle and the rightful tire ID information which is tire ID information of a rightful tire mounted on the vehicle in association with each other, the second database being configured to store tire ID information for identifying a tire and the tire status information indicating whether or not the tire identified with the tire ID information is a stolen tire in association with each other,
  wherein in a case where the reader acquires the tire ID information, the controller refers to the second database, and if the information indicating that the tire identified with the tire ID information is a stolen tire is stored as the tire status information in association with the tire ID information, the controller restricts operation of the vehicle to be controlled.

7. A vehicle control method for controlling a vehicle to be controlled, the method comprising:
  a step of, by a reader configured to perform near field communication with a transmitter which is attached to a tire mounted on a vehicle to be controlled and which transmits tire ID information for identifying the tire, acquiring the tire ID information transmitted by the transmitter;
  a step of, in a case where the reader cannot acquire rightful tire ID information stored in a first database in association with vehicle ID information of the vehicle to be controlled, determining that the tire identified with the tire ID information has been stolen and updating tire status information stored in a second database with information indicating that the tire identified with the tire ID information is a stolen tire, the first database being configured to store vehicle ID information for identifying a vehicle and the rightful tire ID information which is tire ID information of a rightful tire mounted on the vehicle in association with each other, the second database being configured to store tire ID information for identifying a tire and the tire status information indicating whether or not the tire identified with the tire ID information is a stolen tire in association with each other; and
  a step of, in a case where the reader acquires the tire ID information, referring to the second database, and if the information indicating that the tire identified with the tire ID information is a stolen tire is stored as the tire status information in association with the tire ID information, restricting operation of the vehicle to be controlled.

8. The tire theft monitoring system according to claim 2, wherein, in a case where the information that indicates that the tire identified with the tire ID information is a stolen tire is stored in the second database as the tire status information in association with the tire ID information acquired by the reader, the controller issues an alarm to surroundings of the vehicle to be controlled.

9. The tire theft monitoring system according to claim 2, wherein, in a case where the information that indicates that the tire identified with the tire ID information is a stolen tire is stored in the second database as the tire status information in association with the tire ID information acquired by the reader, the controller provides information regarding the vehicle to be controlled to a predetermined institution.

10. The tire theft monitoring system according to claim 2, further comprising a third database configured to store the vehicle ID information and a contact information of an owner of a vehicle identified with the vehicle ID information in association with each other, wherein in a case where the information that indicates that the tire identified with the tire ID information is a stolen tire is stored in the second database as the tire status information in association with the tire ID information acquired by the reader, the controller notifies that the tire identified with the tire ID information is a stolen tire to the contact information stored in the third database in association with the vehicle ID information of the vehicle to be controlled.

11. The tire theft monitoring system according to claim 3, wherein, in a case where the information that indicates that the tire identified with the tire ID information is a stolen tire is stored in the second database as the tire status information in association with the tire ID information acquired by the reader, the controller provides information regarding the vehicle to be controlled to a predetermined institution.

12. The tire theft monitoring system according to claim 3, further comprising a third database configured to store the vehicle ID information and a contact information of an owner of a vehicle identified with the vehicle ID information in association with each other, wherein in a case where the information that indicates that the tire identified with the tire ID information is a stolen tire is stored in the second database as the tire status information in association with the tire ID information acquired by the reader, the controller notifies that the tire identified with the tire ID information is a stolen tire to the contact information stored in the third database in association with the vehicle ID information of the vehicle to be controlled.

13. The tire theft monitoring system according to claim 4, further comprising a third database configured to store the vehicle ID information and a contact information of an owner of a vehicle identified with the vehicle ID information in association with each other, wherein in a case where the information that indicates that the tire identified with the tire ID information is a stolen tire is stored in the second database as the tire status information in association with the tire ID information acquired by the reader, the controller notifies that the tire identified with the tire ID information is a stolen tire to the contact information stored in the third database in association with the vehicle ID information of the vehicle to be controlled.

14. The tire theft monitoring system according to claim 8, wherein, in a case where the information that indicates that the tire identified with the tire ID information is a stolen tire is stored in the second database as the tire status information in association with the tire ID information acquired by the reader, the controller provides information regarding the vehicle to be controlled to a predetermined institution.

15. The tire theft monitoring system according to claim 8, further comprising a third database configured to store the vehicle ID information and a contact information of an owner of a vehicle identified with the vehicle ID information in association with each other, wherein in a case where the information that indicates that the tire identified with the tire ID information is a stolen tire is stored in the second database as the tire status information in association with the tire ID information acquired by the reader, the controller notifies that the tire identified with the tire ID information is a stolen tire to the contact information stored in the third database in association with the vehicle ID information of the vehicle to be controlled.

16. The tire theft monitoring system according to claim 14, further comprising a third database configured to store the vehicle ID information and a contact information of an owner of a vehicle identified with the vehicle ID information in association with each other, wherein in a case where the information that indicates that the tire identified with the tire ID information is a stolen tire is stored in the second database as the tire status information in association with the tire ID information acquired by the reader, the controller notifies that the tire identified with the tire ID information is a stolen tire to the contact information stored in the third database in association with the vehicle ID information of the vehicle to be controlled.

* * * * *